Jan. 27, 1953 I. H. PAGE 2,627,023

NOISE REDUCING RADIO RECEIVER

Filed Sept. 12, 1942

Inventor

Irving H. Page

By [signature]

Attorney

Patented Jan. 27, 1953 2,627,023

UNITED STATES PATENT OFFICE 2,627,023

NOISE REDUCING RADIO RECEIVER

Irving H. Page, Silver Spring, Md.

Application September 12, 1942, Serial No. 458,148

3 Claims. (Cl. 250—20)

(Granted under Title 35, U. S. Code (1952), sec. 266)

This invention relates broadly to interference free receivers and more particularly to such receivers applicable to radio echo apparatus.

Modern transmitters now employed in radio echo apparatus generally send out a series of sequential radio pulses in a unidirectional beam, which upon striking an obstacle lying within the line of focus of the radiated beam are reflected back to a receiver antenna. The amount of energy reflected to the receiver is of course a function of the amount of transmitted energy, the distance the obstacle lies from the transmitter and receiver, the size of the obstacle and its reflecting ability. The amplitude of the reflected energy or pulse echo is usually very small and therefore an ultra-high gain receiver is required in order to amplify the signal sufficiently to operate a visual indicator such as the cathode ray tube. In addition to the high gain feature, the receiver must also possess the ability to pass a relatively wide band of frequencies in order to reproduce a reasonable amount of intelligence of the echo since the pulse will contain frequency components extending, theoretically, to infinity on both sides of the carrier.

Heretofore interfering signals falling within the band width of the receiver and emanating from nearby transmitters would greatly jeopardize the reception of the echo.

It is therefore an object of this invention to provide a receiver that will eliminate interfering signals.

It is another object of this invention to provide a receiver that will utilize interfering signals as a means of heterodyning tuned signals.

It is another object of this invention to provide a section of a receiver which may be installed in an ordinary receiver to eliminate interfering signals.

Other objects will become apparent from the following description when taken together with the accompanying drawings, in which.

Figure 1:
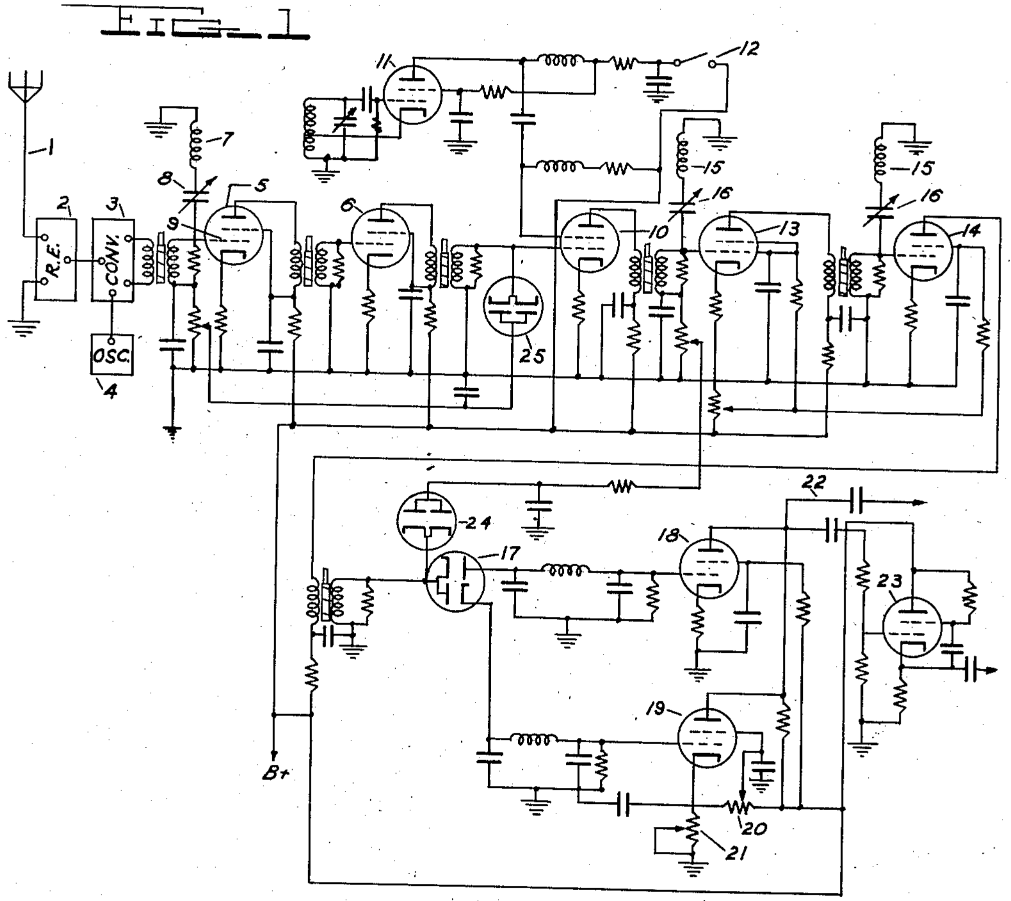
Fig. 1 is a schematic diagram of a circuit embodying the present invention.

This invention can be more fully understood by assuming an interfering signal of say, 198 megacycles cutting the receiver antenna 1 of Fig. 1 at the same time a tuned signal of 200 megacycles cuts the antenna. It must be remembered, however, that this receiver contains the ability to receive signals extending in frequency to at least 2 megacycles on both sides of the carrier. Therefore, the interfering signal is passed and amplified by the same amount as the tuned signal. Subsequent to the amplification of both the interfering signal and tuned signal by the radio frequency amplifier section 2, both signals are passed on to the converter 3 where they are heterodyned to some lower frequency, say 14 megacycles and 16 megacycles respectively by the oscillator 4. From the converter the signals are fed into an intermediate frequency amplifier section which may contain one or more amplifiers as found desirable. In this case two tubes 5 and 6 are connected in cascade. A rejection filter comprising a series inductance 7 and variable capacitance 8 is tied in parallel with the control grid 9 of tube 5. This filter can just as conveniently consist of a capacitance and variable inductance. Regardless of form, it is tuned to the interfering signal, 14 megacycles, and dissipates a portion of the interfering energy. From the intermediate frequency section the signals are fed into a second converter 10. The output of this converter is tuned to a still lower frequency, say 2 megacycles. Ordinarily the second beat oscillator 11 would be used to heterodyne the tuned signal to the 2 megacycle output, but this would also beat the interfering signal to some lower frequency which would pass to the output circuit, therefore, with the interfering signal present the second beat oscillator is disconnected from the circuit by switch 12 and the interfering signal is used as the beat oscillator. Thus, the useful beat output will be 2 megacycles for which the output circuit is tuned. From the second converter 10 the signal or signals, in the event that some of the interference filters through the foregoing eliminating means, are fed into a second section of intermediate frequency amplification. This section also contains two stages of amplification comprising tubes 13 and 14 positioned in cascade. The control grids of each of these tubes has connected in parallel therewith a rejection filter comprising a series inductance 15 and variable capacitance 16. These filters are tuned to the interference signal or to a point where optimum output is noted. From the last stage of the second intermediate frequency amplifier section the tuned signal and residual interfering signal are fed into a twin diode 17 which has the cathode of one diode tied to the anode of the other diode to represent an input connection. The output from twin diode 17 is coupled to the grids of amplifiers 18 and 19 which have their anodes tied in parallel in order that their instantaneous outputs will be in phase opposition. The operation of this circuit is more fully described in the application of Irving H. Page, Serial No. 454,640, filed August 13, 1942, but briefly is a means of eliminating those interfering signals that predominate over tuned signals. The strong interfering signals which are impressed on the grids of these amplifiers have simultaneous outputs which buck each other and can be made to cancel out by adjusting the variable resistances 20 and 21 which control the output of amplifier 19 to equal the output of amplifier 18. The weak tuned signals are amplified and passed through tube 18 to the output. The output of this circuit may be fed through line 22 directly to the intensity grid or deflection plate of the cathode ray tube. If it is desired, however, to energize a cathode ray tube at some remote location from the receiver the high output impedance of the circuit may be dropped to a low impedance by tube 23 to match that of standard coaxial transmission line. Twin diodes 24 and 25 are used to provide the receiver with automatic volume control.

Now to consider a 200-megacycle interfering signal cutting the receiver antenna simultaneously with a 200-megacycle tuned signal. Both of these signals are of course heterodyned to a lower frequency of about 16 megacycles by the converter 3 and local oscillator 4. The rejection filter comprising inductance 7 and variable capacitance 8 is tuned to 16 megacycles and therefore dissipates a portion of the interfering energy and also some of the fundamental frequency of the radio echo pulse. The intelligence of the pulse is not greatly impaired since it contains a large number of frequency components which will pass on through the intermediate frequency amplifier. The switch 12 is closed and starts the second local oscillator to produce a second intermediate frequency beat, of say 2 megacycles, since the beat between the interference and tuned signals in this case will be zero. The rejection filters comprising indutcance 15 and variable capacitance 16 are then tuned to 2 megacycles which dissipate more of the interfering energy and also some of the tuned signal, but again due to the large number of frequency components inherent in the tuned signal the intelligence of the pulse is not greatly impaired. The remaining stages of the receiver function as previously described.

Figure 2:
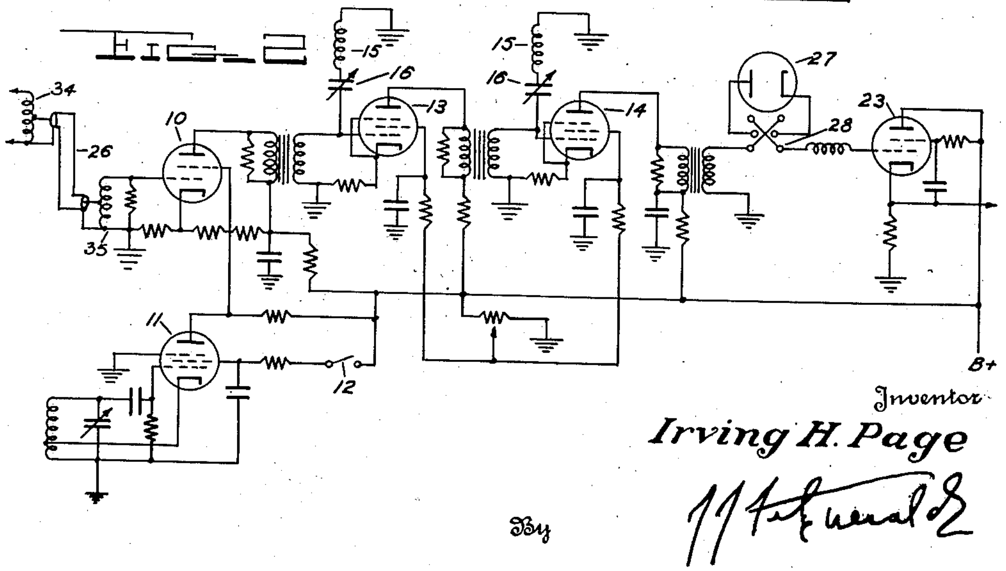
Fig. 2 is a schematic diagram of a circuit embodying the present invention and taking the form of an adaptor unit which can be readily installed in an ordinary radio receiver.

The circuit shown in Fig. 2 is that part of the novel receiver that embodies the present invention and may be readily installed in any ordinary superheterodyne receiver to produce results that equal those obtained by the receiver of Fig. 1, its operation being somewhat similar. The winding 34 is preferably the primary winding of the last intermediate frequency stage of an ordinary receiver and is coupled to a secondary winding 35 by the coaxial transmission line 26. The intermediate frequency output of winding 35 is fed into the converter 10 where it is heterodyned by the inherent interfering signal or the local oscillator 11 in case there is no interfering signal present. Tubes 13 and 14 are of course the second intermediate frequency amplifier section and rejection filters comprising inductance 15 and variable capacitance 16 are used to dissipate any residual interfering energy. The reversing switch 28 and diode 27 are provided in the output circuit to reverse the polarity of the pulse in order to satisfy the operation of different receivers. Tube 23 provides a convenient means of reducing the output impedance to a value that will match the impedance of a standard transmission line, thereby making it possible to pipe the output pulse to an oscilloscope situated in a remote location.

From the foregoing description, it is quite obvious that this receiver will reject interfering signals both weak and strong regardless of their modulation characteristic. Accordingly, this receiver produces optimum definition of signal and consequently loses very little intelligence.

Although I have shown and described certain and specific embodiments of the present invention I am fully aware of the many modifications possible thereof. Therefore, this invention is not to be restricted except insofar as is necessitated by the prior art and the spirit of the appended claims.

The invention described herein may be manufactured and used by or for the Government of the United States of America for governmental purposes without the payment of any royalties thereon or therefor.

I claim:

1. A receiver for deriving desired modulation components of a received pulse-modulated carrier-frequency wave signal but subject to receive concurrently therewith an interfering wave signal of different frequency than the carrier frequency of said pulse-modulated signal comprising, a first signal-translating means including selector circuits having a selective characteristic of such range to include both of said received signals, heterodyne detecting means included in said first signal-translating means effective in the presence of said interfering signal with high intensity to derive from said received signals a heterodyne-component pulse-modulated signal having modulation components corresponding to said desired components, a local oscillator coupled to said heterodyne detecting means tuned to generate a signal of substantially the same frequency as the interfering signal wave, manually operable means for rendering said oscillator operative whereby said oscillator may be actuated during the absence of an interfering signal wave to derive from the pulse modulated carrier wave a heterodyne-component pulse modulated signal having modulation components corresponding to said desired components, a second signal-translating means coupled to said detecting means and including selector circuits for translating said heterodyne-component pulse-modulated signal, rectifying means included in said second signal-translating means effective to derive said desired modulation components from said heterodyne-component pulse-modulated signal, and means coupled to said second signal-translating means including a low-pass filter for supplying substantially only said desired modulation components to a utilizing device.

2. A receiver for deriving desired modulation components of a received pulse-modulated carrier-frequency wave signal but subject to receive concurrently therewith an interfering wave signal of different frequency than the carrier frequency of said pulse-modulated signal comprising, a first signal-translating means including selector circuits having a selective characteristic of such range to include both of said received signals, heterodyne detecting means included in said first signal-translating means effective in the presence of said interfering signal with high intensity to derive from said received signals a heterodyne-component pulse-modulated signal having modulation components corresponding to said desired components, a local oscillator coupled to said heterodyne detecting means tuned to generate a signal of substantially the same frequency as the interfering signal wave, manually operable means for rendering said oscillator operative whereby said oscillator may be actuated during the absence of an interfering signal wave to derive from the pulse modulated carrier wave a heterodyne-component pulse modulated signal having modulation components corresponding to said desired components, a second signal-translating means coupled to said detecting means and including selector circuits for translating said heterodyne component pulse-modulated signal, rectifying means included in said second signal-translating means effective to derive said desired modulation components from said heterodyne-component pulse-modulated signal, and means coupled to said second signal-translating means for supplying said desired modulation components to a utilizing device.

3. A receiver for deriving desired modulation components of a received pulse-modulated carrier-frequency wave signal but subject to receive concurrently therewith an interfering wave signal of different frequency than the carrier frequency of said pulse-modulated signal comprising, a first signal-translating means including selector circuits having a selective characteristic of such range to include both of said received signals, heterodyne detecting means included in said first signal-translating means effective in the presence of said interfering signal with high intensity to derive from said received signals a heterodyne-component pulse-modulated signal having modulation components corresponding to said desired components, a local oscillator coupled to said heterodyne detecting means tuned to generate a signal of substantially the same frequency as the interfering signal wave, manually operable means for rendering said oscillator operative whereby said oscillator may be actuated during the absence of an interfering signal wave to derive from the pulse modulated carrier wave a heterodyne-component pulse modulated signal having modulation components corresponding to said desired components, a second signal-translating means coupled to said detecting means and including selector circuits for translating said heterodyne-component pulse-modulated signal, full-wave rectifying means included in said second signal-translating means effective to derive said desired modulation components from said heterodyne-component pulse-modulated signal, and means coupled to said second signal-translating means for supplying said desired modulation components to a utilizing device.

IRVING H. PAGE.

REFERENCES CITED

The following references are of record in the file of this patent:

UNITED STATES PATENTS

| Number | Name | Date |
|---|---|---|
| 1,472,092 | Round | Oct. 30, 1923 |
| 1,717,662 | Chaffee | June 18, 1929 |
| 1,742,252 | Holden | Jan. 7, 1930 |
| 1,814,051 | McCaa | July 14, 1931 |
| 2,066,940 | Koch | Jan. 5, 1937 |
| 2,080,281 | Koch | May 11, 1937 |
| 2,094,625 | Thompson | Oct. 5, 1937 |
| 2,103,878 | Thompson | Dec. 28, 1937 |
| 2,151,810 | Siemens | Mar. 28, 1939 |
| 2,186,455 | Goldmark | Jan. 9, 1940 |